United States Patent [19]

Davis

[11] 4,315,110
[45] Feb. 9, 1982

[54] MULTIPLE LINE TELEPHONE INSTRUMENT

[75] Inventor: James M. Davis, Corinth, Miss.

[73] Assignee: International Telephone and Telegraph Corporation, New York, N.Y.

[21] Appl. No.: 144,780

[22] Filed: Apr. 28, 1980

[51] Int. Cl.³ .............................................. H04Q 5/18
[52] U.S. Cl. ................................ 179/99 M; 179/18 J
[58] Field of Search ............... 179/99 M, 18 J, 18 FA

[56] References Cited

U.S. PATENT DOCUMENTS

| | | | |
|---|---|---|---|
| 3,843,845 | 10/1974 | Ridley | 179/99 M |
| 3,935,396 | 1/1976 | Barsellotti et al. | 179/99 M |
| 4,046,972 | 9/1977 | Huizinga et al. | 179/99 M |
| 4,125,749 | 11/1978 | Kinoshita et al. | 179/18 J |
| 4,203,011 | 5/1980 | Coviello | 179/99 M |

*Primary Examiner*—Gerald L. Brigance

*Attorney, Agent, or Firm*—James B. Raden; Marvin M. Chaban

[57] ABSTRACT

The present invention is directed to a multiple line telephone instrument operative over a pair of data conductors and a pair of speech conductors using time division principles. The data pair transmits line condition signaling and control using an asynchronous sixteen bit binary code while the speech and dialing information is sent over the speech pair of conductors in standard analog format for translation to PCM code within the system (not shown herein). Line condition signaling between an instrument and its group logic circuit or group processor is in parallel over the data pair. Incoming line condition signaling information is used to generate an audible signal and to illuminate a selected lamp representing the desired line. Outgoing line condition signaling is encoded in diphase code using a square wave of a second frequency to represent a binary zero. The outgoing encoding ensures that only one or the other binary signal is sent and to ensure that the signals are sent in diphase mode.

9 Claims, 9 Drawing Figures

MULTIPLE LINE TELEPHONE INSTRUMENT

BACKGROUND OF THE INVENTION

Multiple line telephone instruments using four conductors for the instrument, one pair for signaling and the other pair for speech transmission are known from art such as U.S. Pat. No. 3,935,396 issued Jan. 27, 1976 to J. Barsellotti, et al. In this patent, space division switching was employed to provide the switching control for bidirectional speed transfer. A custom coding arrangement was employed in time division multiplex over the data bus to provide the supervisory controls for analog speech transmission over the switched path. Systems using the principle of the patent have been made and sold by the International Telephone and Telegraph Corporation as systems of the MKS-100 Key System, and are described in an article entitled "Data Controlled Key Telephone System" by J. McNeilly and J. Barsellotti on pages 187-190 of *Electrical Communication*. Volume 52 Number 3.1977.

A series of patents issued to the Bell System cover multiple line telephone instruments using four data conductors and two analog speech conductors. For example, see U.S. Pat. No. 3,749,848 issued July 31, 1973 to D. Knollman, et al. A similar approach is shown in earlier U.S. Pat. No. 3,519,757 to H. Anderson, et al issued July 7, 1970 with a fifteen conductor data bus.

In these systems, the instrument is activated over the data bus, control and supervisory signals are transmitted over the data bus to control the switching or the analog speech pair for that instrument and to transmit further control signals bidirectionally over the data bus.

In the first-mentioned prior art system, U.S. Pat. No. 3,935,396, the signaling over the data pair or data bus was transmitted in diphase form with square wave signals of one frequency forming one binary digit and signals of a second frequency at twice the first frequency forming the other binary digit. Line condition data transmitted and data received at the instrument was in the form of an eight bit signal followed by an eight bit complementary check signal. Sixteen bits of data comprises a full signal.

SUMMARY OF THE INVENTION

The present invention is directed to a multiple line telephone instrument employing time division switching using four conductors as its input/output conductors; i.e., a speech pair and a data pair. The speech pair preferably transmits analog signals; however, if desired, speech and destination could be coded in the instrument to transmit this information in PCM form or other suitable code format. The operation of the present invention would be essentially the same regardless of the speech conductor format. Line condition and line signaling data is transmitted in asynchronous time division code bidirectionally over the data conductor pair per station instrument to a processor dedicated to handling those lines. Each instrument is accessed over its individual data pair; the instrument therefore requires no address recognition logic.

Call condition and instrument signaling data is received by an instrument from its group processor over the instrument data pair, the first bit of data causing activation of the instrument clock timing. The timing once enabled remains enabled for a timed period after the termination of data.

Activation of the instrument timing clock enables the instrument for the receipt of data and consequent activation of the tone caller and/or the LED display.

Responsive to raising the hookswitch or activation of a push button, a transmit control circuit generates a signal to translate the indication of switch or button operation into diphase code for transmission. The diphase encoding circuit uses an eight bit shift register to receive a signal on hookswitch or button closure to activate one or another path, the paths being clocked at different rates representing the frequency for either binary zero or binary one. The output of the shift register is connected through an inverter, to the serial input of the same register to produce an eight bit complement output.

The invention has as its major object to provide a simple line condition signaling circuit which emits an output signal in sixteen bits, the final eight bits comprising the complement of the first eight, and which circuit automatically emits the bits at either a first or a second frequency and which automatically toggles to produce the signals in diphase mode at the proper frequency.

A further object of the invention is to provide a multiple line telephone instrument using time division signaling control transmitted bidirectionally over a pair of signaling conductors in diphase format, the instrument having error checking apparatus for converting diphase to binary only in the absence of diphase errors and for deleting any complete signal which includes a diphase error.

A still further object of the invention is to provide a multiple line key telephone instrument with shift register control of the monitoring of line key operation to produce an eight bit code for each grouping of ten or less keys. Other objects, features and advantages of the invention will become apparent from the following specification viewed in conjunction with the drawings described next herein.

BRIEF DESCRIPTION OF THE DRAWINGS

FIG. 2 is a block diagram showing how FIGS. 2A-2E are positioned to produce a detailed schematic circuit diagram of the block diagram of FIG. 1;

DETAILED DESCRIPTION OF THE DRAWINGS

Figure 1:
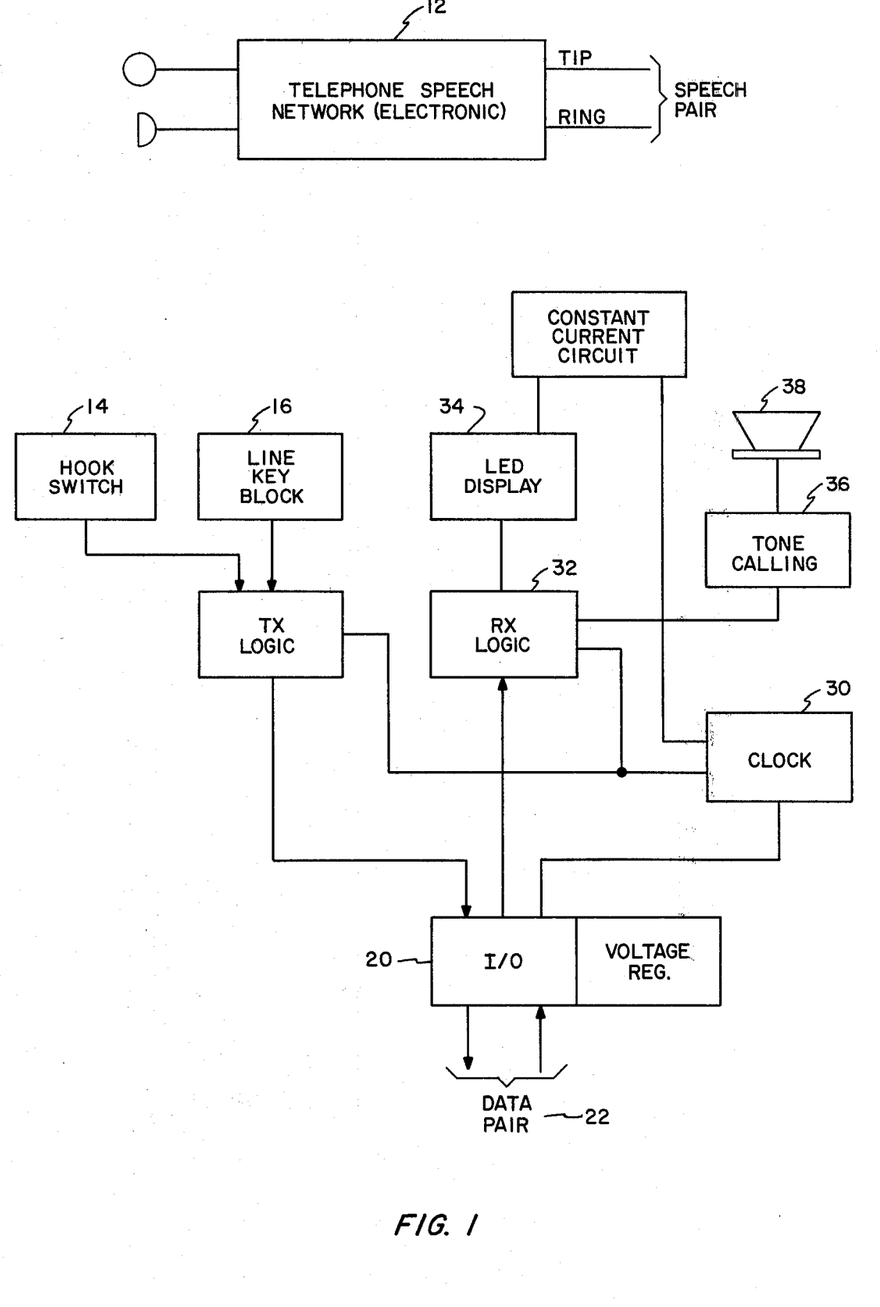
FIG. 1 is a schematic block diagram circuit of my multiple line telephone instrument for ten lines.

In FIG. 1, I provide a schematic block diagram of the circuitry within a telephone instrument having access to up to ten lines.

In the instrument as shown, the speech network 12 is separated from the data network, each network having a bidirectional conductor pair providing communication between the instrument and a processor, the processor adapted to handle a group of as many as a 24 station instrument in a system of the type shown in U.S. patent application Ser. No. 135,464 filed Mar. 31, 1980 in the name of F. Ahmed.

The telephone speech network may use any type of signal transmission such as analog, delta modulation or PCM to transfer speech and dialing information by means and methods outside the scope of the present invention.

The present invention is concerned with the transfer of line condition information from the instrument to the system, and from the system to the instrument.

At the instrument, the condition of the hookswitch 14 and that of the buttons of the line key block 16 are sensed and the conditon encoded within the transmit (TX) logic 18 for transmission through the I/O circuit 20 to the data pair 22.

Incoming line condition and signal control data is received in the I/O circuit 20 and enables the clock timing circuit 30. The clock circuit 30 enables the receive logic (RX) 32 to decode incoming data and illuminate the lamp or lamps in the LED display 34 representing lines which are active. In addition, the RX logic 32 activates tone signaling or tone calling circuit 36 for the instrument when audible signaling of transducer 38 is indicated.

Figures 2, 2C:
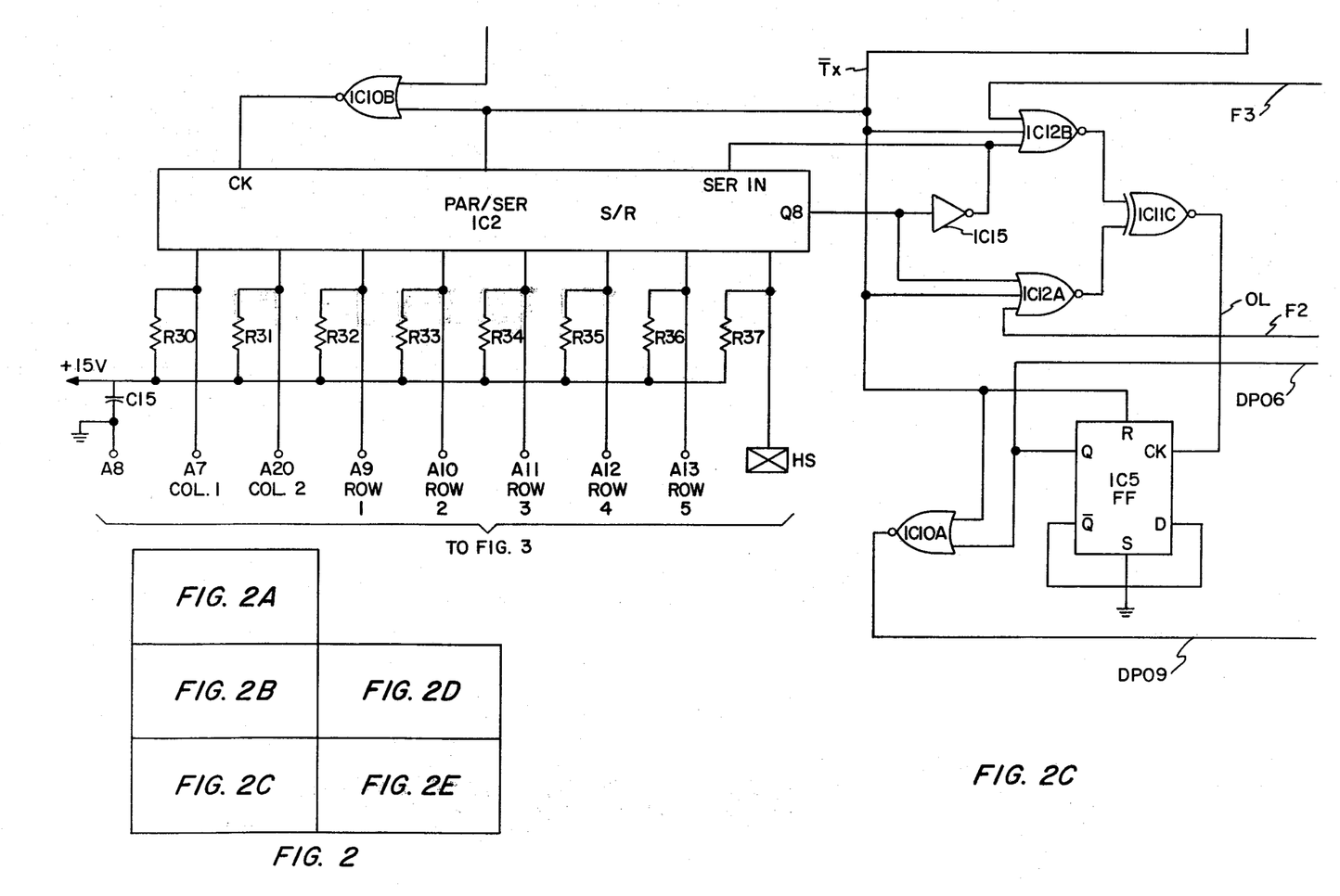
Figure 2A:
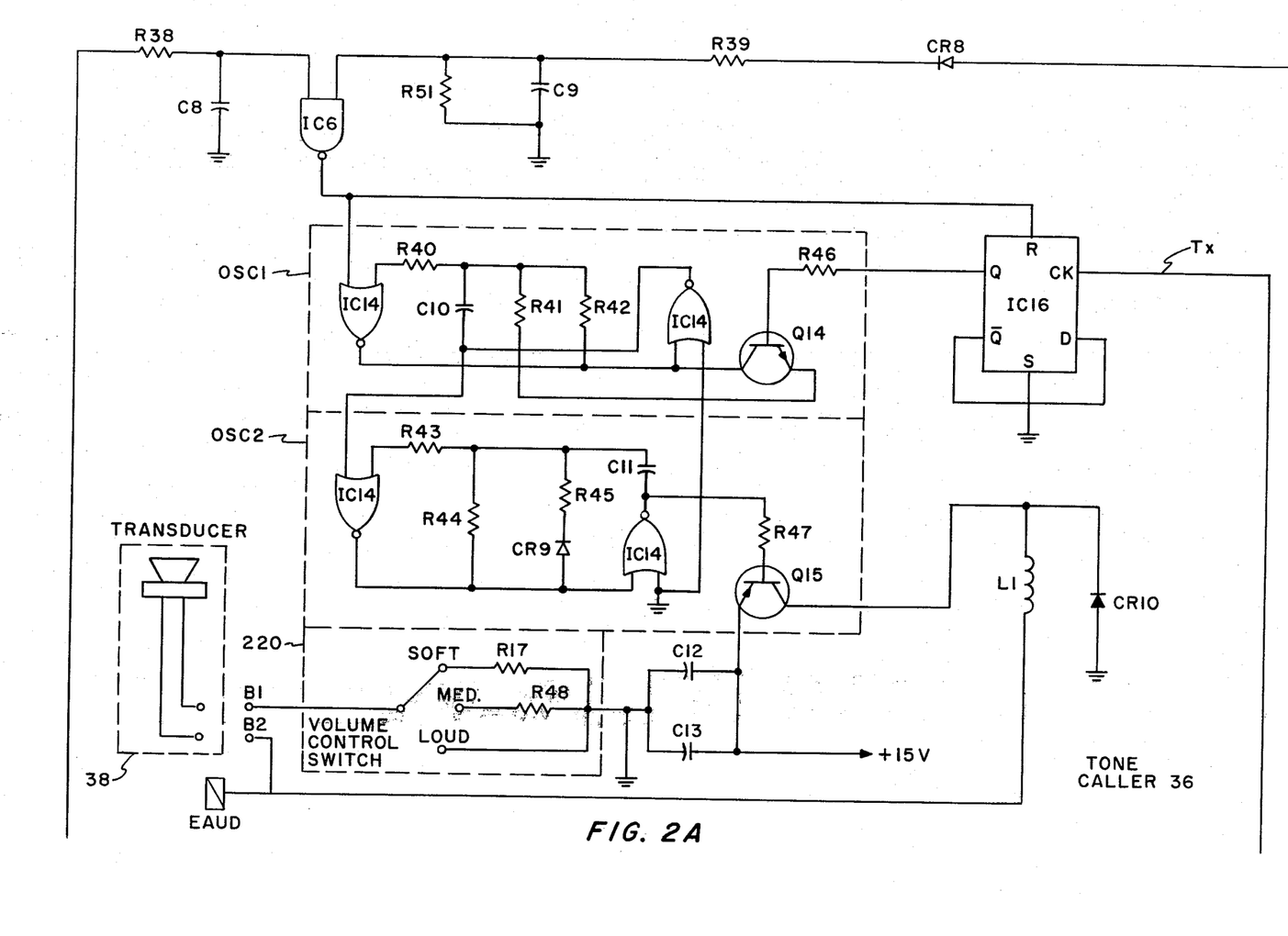
Figure 2B:
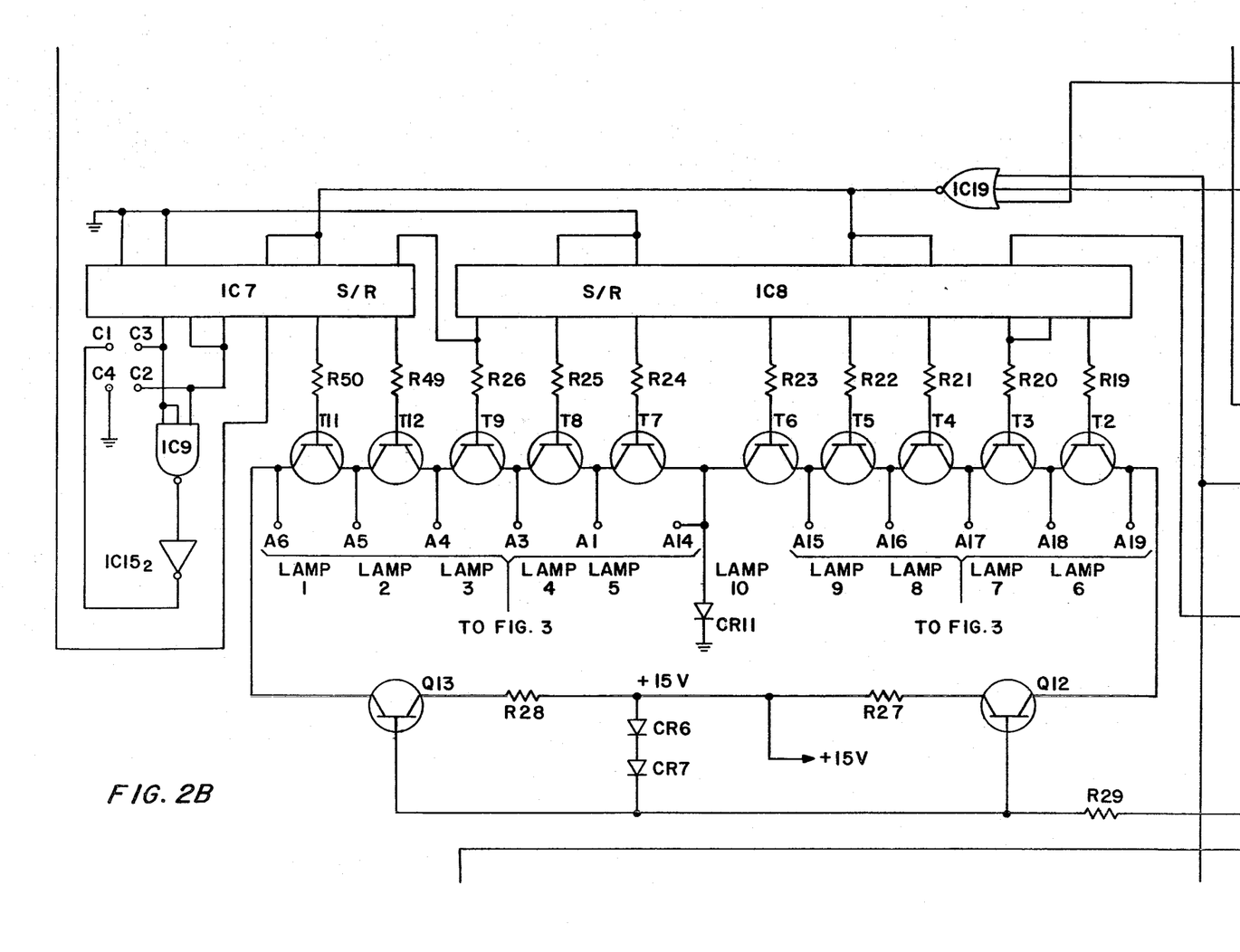
Figure 2D:
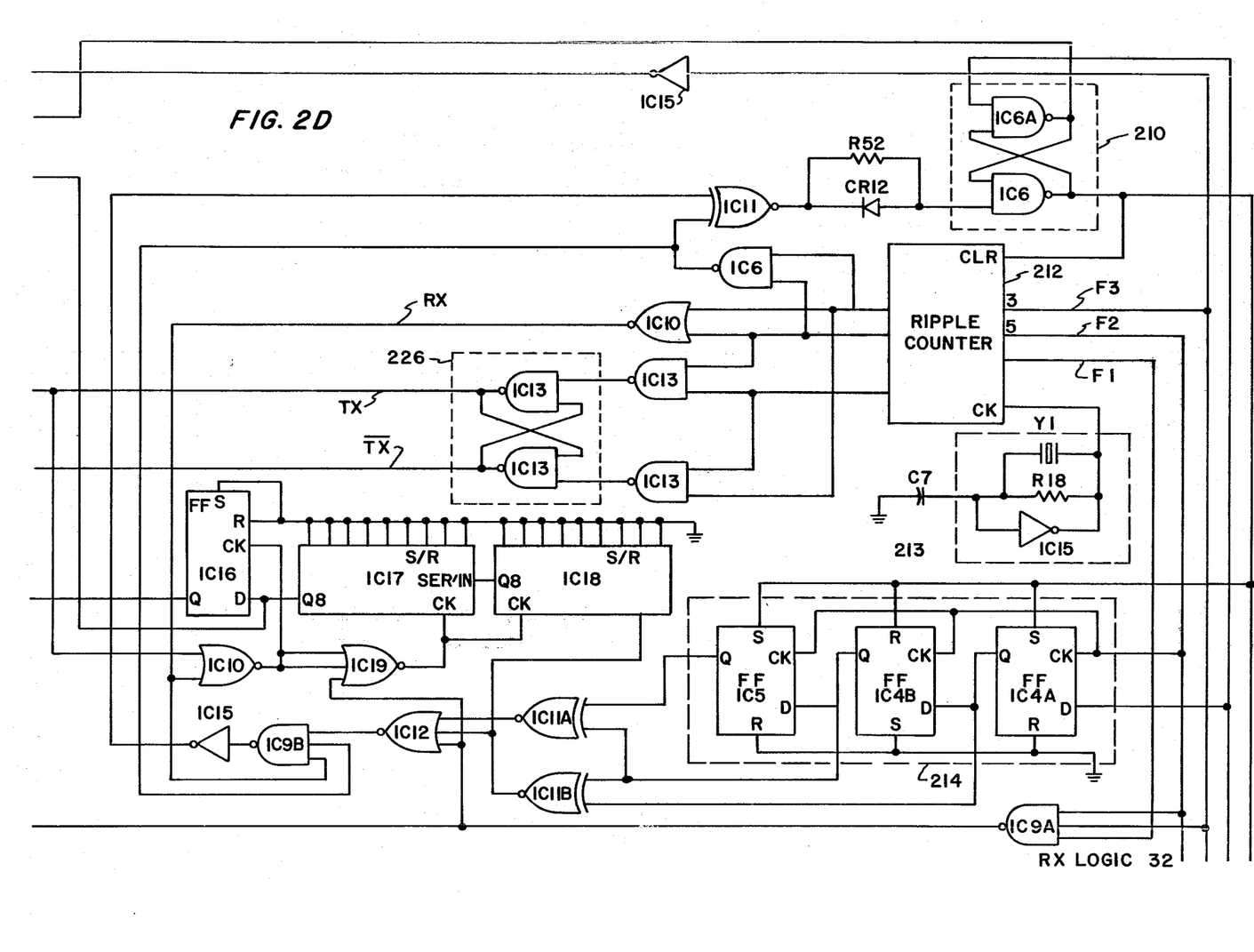
Figure 2E:
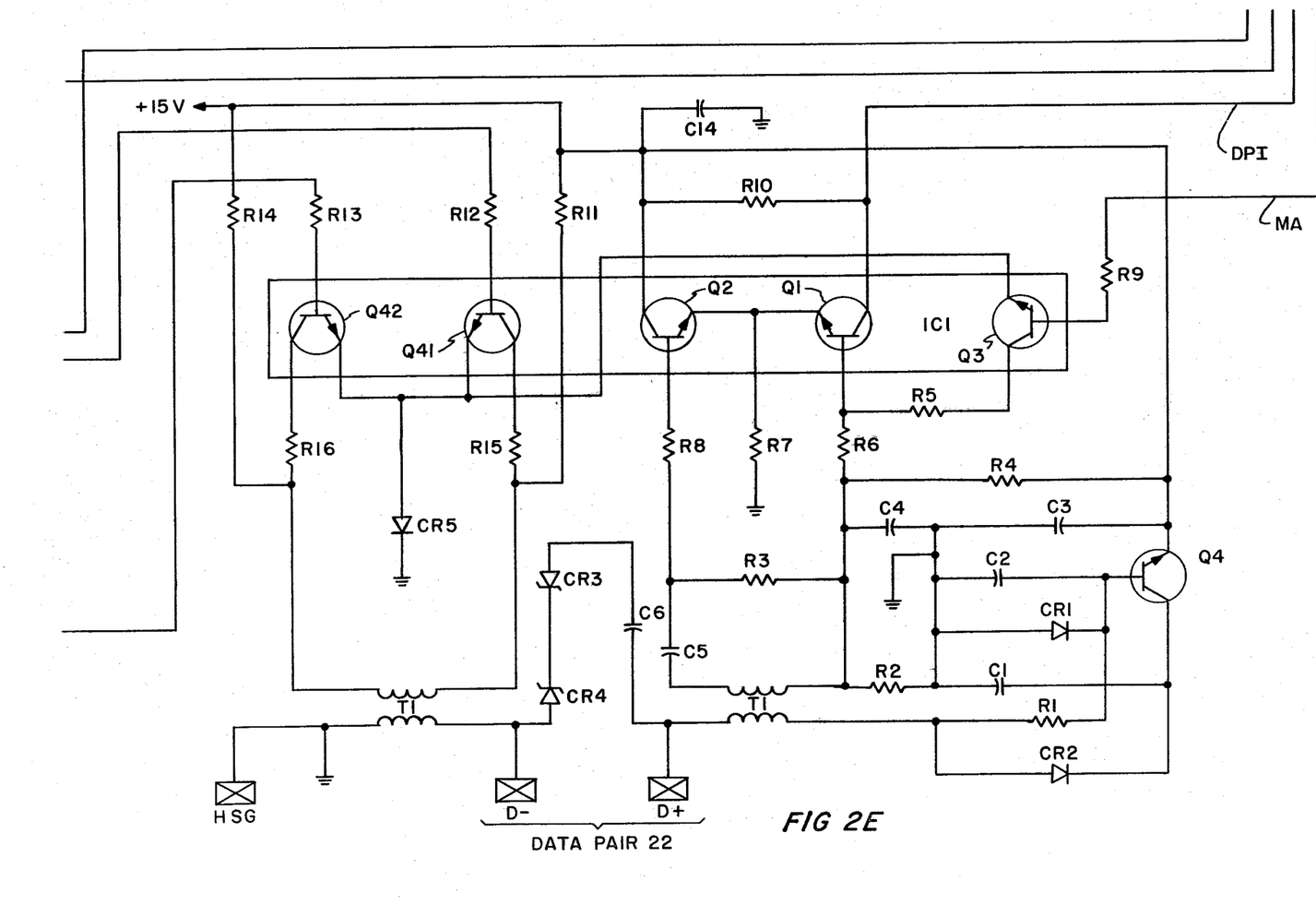

In FIG. 2E, I show the input-output (I/O) circuit which is very similar to that used in the key system MKS100 series previously referred to. Input data is received over the D+ and D− leads comprising the data pair.

Incoming data in diphase form passes through the isolation transformer T to remove any direct current component from the incoming signal. During the period when no diphase signals are incoming over the data pairs, transistor Q3 is maintained in a saturated state over the MA lead from latch 210. With transistor Q3 saturated, the base voltage of transistor Q1 is less than that of transistor Q2. The collector of transistor Q1 is forced to a high condition causing lead MA to assume a threshold voltage. The threshold establishes a requirement that received voltages exceed the threshold before enabling the circuit, thereby preventing noise from initially triggering the instrument circuit of FIG. 2

When the threshold voltage is exceeded by the first negative transition of data received over the data pair, transistor Q1 turns on impressing a low voltage on lead DPI to the upper input of flip-flop 1C6A to turn on the latch 210 comprised of 1C6A and 1C6B. With the latch turned on, lead MA goes low turning off transistor Q3. When lead MA goes low, the encoding/decoding circuit is enabled.

The enabling of the circuit of FIG. 1 over lead MA activates the 12 bit binary ripple counter 212 at terminal CLR to initiate the operation of the counting chain. The ripple counter has a single clock input over its terminal CK from the oscillator circuit 213. The oscillator circuit includes the oscillator Y1 which has a basic frequency of 3.5759 MHZ. Outputs of the ripple counter 212 are transmitted on lead F1, (447.44 KHZ), F2, (223.72 KHZ) and F3, (111.86 KHZ). These outputs serve as the clocking for the receive the transmit functions, as will be described later herein.

The receive logic 32 of FIG. 2D, includes three dual, D type flip-flops (1C4A, 1C4B and 1C5) in stage 214 which combine with the dual Exclusive OR gates 1C11 A and B to act as a decoder to convert incoming diphase to binary digital. The decoder also acts to detect any diphase error.

The first signal received by flip-flop 1C4A must be a low from lead DPI. This low may be followed by a second low in which the outputs of flip-flops 1C4A and 4B would be low. A third successive low indicative of diphase error would render the outputs of all three flip-flops low. The Exclusive OR gates 1C11 (A and B) have their inputs connected to adjacent flip-flops to respond only where the flip-flop outputs are not the same. Otherwise in the event of identical successive outputs, the gates latch and reset to ignore the erroneous data.

Data exhibiting proper diphase transitions are fed to shift register 1C18. This register in conjunction with shift register 1C17 counts sixteen error free bits having been translated to binary. At the end of the sixteeth bit the output of the shift registers is fed out serially to shift registers 1C7 and 1C8. These registers have parallel outputs paths and are clocked to operate the indicated transistor or transistors T2-T11 in the respective paths to illuminate the indicated LED's lamps of FIG. 3. Each lamp is associated with and physically adjacent to a button, the buttons and lamps each representing a line or feature of those accessible at the instrument.

Figure 3:
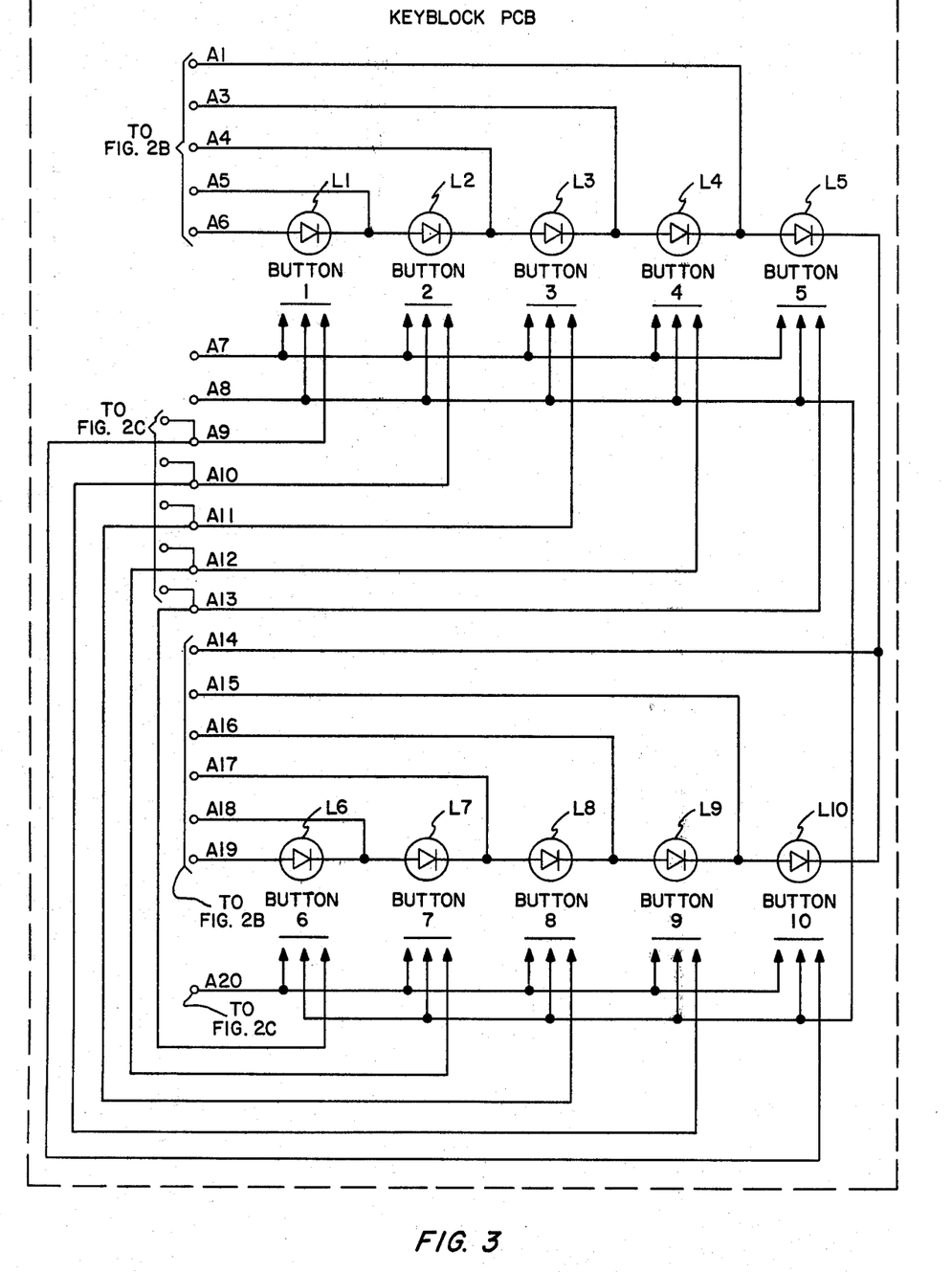
FIG. 3 is a schematic circuit diagram of the key block of FIG. 1.

The ten LED's (L1-L10) that consitute the output display are arranged in two strings with five LED's per string. A constant current source for each string provides approximately 10 MA of current through each string via transistors Q13 and Q12. Across each transistor T2-T11 of FIG. 3 are a pair of conductors of the alignment of conductors A1, A3-6 and A14-19 directed to the LED's L1-L10. One or more of these transistors are selectively switched on by the shift registers 1C7 and 1C8 in response to the decoded input or received signals to shunt current away from the respective LED or LED's turning it off. In the normal condition, with all LED's off, all transistors therefore will be on. The steady on condition of the LED lamp indications and the wink rates of the LED's are controlled by the received code as decoded acting on shift registers 1C7 and 1C8. This method of LED switching is well-known in the art.

For incoming signals which indicate that an audible signal is required, the tone caller circuit of FIG. 2A or similar circuit may be used. The tone caller circuitry of FIG. 2A uses two oscillators driven by signals from the ripple counter 212. OSC 1 is set to oscillate at a frequency of approximately 454 Hz and OSC 2 oscillates at 50 KHZ. Transistor Q14 is turned off and on at an 10 HZ rate by Q lead from flip-flop 1C16 which is clocked at 20 HZ rate by clock lead TX from latch 1C3 and counter 212. Transistor Q14 switches to cause a frequency shift in the oscillator OSC 2 of approximately 476 Hz. The amplitude of the first oscillator modulates OSC 2 which runs at a frequency of 50 K Hz. OSC 2 drives transistors Q15. This is done to save power by keeping Q15 out of active region by driving it between off and saturation. Transistor Q15 drives the tone caller transducer over terminal B1. A number of different volume levels can be chosen by the three position volume control switch 220 which optionally may be located at any suitable position such as the back of the instrument.

To enable the tone caller, the enabling signal on lead $\overline{MA}$ from latch 210 must go high for a period of approximately 430 micro seconds every 50 milliseconds to maintain a charge on capacitor C9. This charge allows the tone caller to oscillate whenever a high logic level is placed on capacitor C8. The levels on the capacitors C8 and C9 from inputs to a two-input NAND gate 1C6. When this gate goes low, its output enables oscillator OSC-1. Oscillator OSC-1 triggers OSC-2 to drive transistor Q15 to produce the desired tone to the transducer.

Closure of one of the momentary buttons of FIG. 3 to activate a line and/or operation of the hookswitch HS activates a latch within the shift register 1C2 to hold the button and intersperse a binary one representing the depressing button within the normal output stream of binary zeroes emitted by the shift register.

The output of the shift register 1C2 from its Q8 Terminal leads to the encoding circuit comprised of NOR gates 1C12 A and B, inverter 1C15 and Exclusive OR gate 1C11C. When the $\overline{TX}$ input to the NOR gates 1C12A and 1C12B is high, no signal passes the Exclusive OR gate 1C11. Thus lead $\overline{TX}$ acts to enable the output lead OL only when lead $\overline{TX}$ goes low. Lead $\overline{TX}$ remains low for a count of sixteen to enable sixteen output bits.

The first eight bits comprise a string of binary zeroes interspersed with one or more binary ones on the lead from terminal Q8 of shift register 1C2. The second eight bits are the complement of the first eight comprised of binary ones interspersed with one or more binary zeroes.

When a binary zero is emitted from the shift register output Terminal Q8, this signal is fed to the input of inverter 1C15 and to an input of NOR gate 1C12A. In the inverter, the binary zero is inverted to a binary one and forwarded to the input of NOR gate 1C12B.

Thus, a signal is sent to the inverter and 1C12A, and its complement is sent to 1C12B. At the same time, clock signals F2 and F3 are being sent to the respective NOR gates 1C12A and B with F3=2F2. Responding to outputs from the shift register, pulses of common polarity of either F2 duration or F3 duration are emitted by one or the other of the NOR gates 1C12 to the Exclusive OR gate 1C11C.

Pulses from the Exclusive OR gate 1C11C are fed to the clock input of flip-flop 1C5, the flip-flop having been reset at the start of the sixteen count period by the $\overline{TX}$ lead. The flip-flop 1C5 output on its Q lead is fed directly on DPO 6 to the base of transistor Q41 (FIG. 2E). The Q output from flip-flop 1C5 is also fed to the input of NOR gate 1C10A, the gate acting as an inverter for output lead DPO 9 to the base of transistor Q42. The flip-flop 1C5 toggles responsive to the signals on lead OL to alternately produce highs and lows. The outputs are switched or toggled from one condition where DPO 6 is high and DPO 9 is low to the reverse condition on the next toggle of the flip-flop 1C5. In this way, the short duration or long duration pulses are converted to diphase signals of the corresponding duration. The diphase is in effect an alternating current which will pass through the primary transformer T1 which is connected across the collectors of transistors Q41 and Q42. The signals are transmitted through the transformer to the data pair D+ and D−. Inverted signals from inverter 1C15 are fed back to the serial input on each clock pulse.

At the end of the eighth bit transmitted by the shift register 1C2, the inverted signal through inverter 1C15 starts a second cycle of the shift register 1C2 reading out the next eight bits as complements of the first eight bits. At the end of the sixteen bit count fed in on lead $\overline{TX}$, the latch 226 comprised of gates 1C13 (FIG. 2D) restores. Lead $\overline{TX}$ goes high terminating the operation of the shift register 1C2. With lead $\overline{TX}$ high, both 1C12A and B are fed the high signal thereby blocking any outputs from the Exclusive OR gate 1C11C.

The apparatus as shown has a timing cycle of six periods each eight bits wide. The first two periods P1 and P2 constitute the receive sequence of sixteen bits. The third period P3 is essentialy a blank or settle down period. Periods P4 and P5 constitute the sixteen bit transmit sequence followed by a final settle down period P6. The timing of these periods is controlled by the counter 212 and its associated logic in a conventional fashion to complete the bidirectional transfer of data to and from the instrument over the single data pair. The single data pair to the instrument may monitor ten lines using the circuit of FIGS. 1–3, or twenty lines using the added address decoders shown in FIG. 4.

Figure 4:
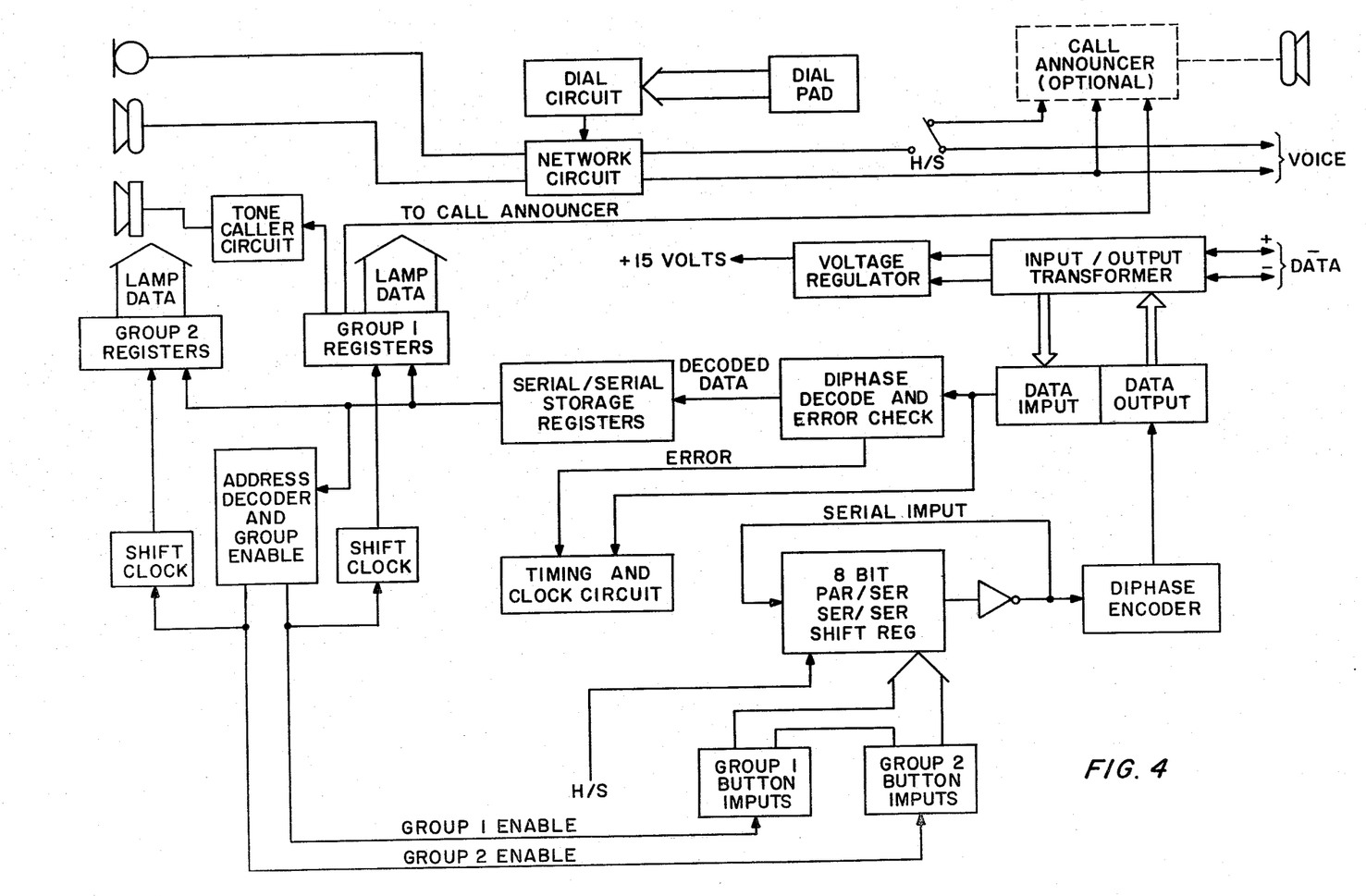
FIG. 4 is a schematic block diagram of a twenty line telephone instrument employing my invention.

In FIG. 4, I show a block diagram of a telephone instrument similar to that shown in FIGS. 1–3, but capable of handling up to twenty lines over its common data pair and common speech or voice pair of conductors.

The voice pair of FIG. 4 is directed to a network circuit which may be that one shown in U.S. patent application Ser. No. 20,647 filed Mar. 15, 1979 by P. F. Blomley to interface with the microphone and transmitter, as shown. The voice pair is shown with an optional Call Announcer, as shown in U.S. Pat. No. 4,101,735 issued July 18, 1978 to E. Bridenbaugh. In such a system, a speaker may be normally connected to receive incoming messages and to emit an output audio message. Operation of the hookswitch H/S transfers the call to a normal mode.

The data pair is connected to the I/O transformer and in the data input path, data is transmitted through the data input switching to the diphase decoder and error check for decoding from diphase to binary. The decoded data is stored in the storage registers and is decoded as to the ten line group to which it is directed by means of a binary bit in its code. This decoding is performed within the address decoder and group enable with the proper group enabled. The designated lamp of the proper group is illuminated.

For the output of data, depression of a button and/or the hookswitch produces a binary code indicative of hookswitch or particular button during the period when the specific group of the buttons is enabled by the group enable circuit. The operation of a button produces a bit during the scan controlled by the eight bit shift register. The data is encoded in diphase and sent to the data output and I/O circuit to the data pair.

The operation of this circuit of FIG. 4 adds a group address bit to enable one or the other group of ten lines and is otherwise similar to the circuit of FIGS. 1–3.

It was noted previously that button closures and hookswitch operation would lead to the transmission from the instrument of an asynchronous sixteen bit code, the second eight bits of the code being the complement of the first eight bits. Since binary zero is indicated by a pulse of first duration and binary one by a second, this complementary technique assures that the duration of a sixteen bit sequence will always be uniform.

As to the binary code, any suitable eight bit code may be used. An example of one code which could be used for the first eight bits is as follows: Instrument idle would be all zeroes; hookswitch alone operated—bit five a one in a string of zeroes; buttons could be represented by two ones in a string of zeroes, i.e. button 1, bits 4 and 7 ones; button 5, bits 0 and 7 ones; button 6, bits 0 and 6 ones and button 10, bits 4 and 6 ones. The button plus hookswitch operation would be indicated by the hookswitch bit (bit 5) plus the two bits representing the button. As mentioned previously, the second eight bits of the sixteen bit sequence are the complement of the first eight bits.

For data to the instrument from the system, a simpler sixteen bit code could be used to represent which of the ten button groups (of a twenty line instrument) is being addressed, and which individual button is being addressed. In addition, if used, a call announcer mode may be signaled and other features may also be signaled.

I claim:

1. A multiple line telephone instrument having a pair of speech conductors and a pair of data conductors for bidirectional transfer of information between said instrument and a system to which the instrument is coupled, said instrument including a plurality of line buttons each representing a line having access to said instrument, said line buttons individually operable to an operative condition, means responsive to an operative condition of one or more said buttons for transmitting an asynchronous coded time division signal over said data pair, said transmitting means including means for emitting a pulse of first duration in response to the absence of an operative condition at the line buttons and for emitting a pulse of second duration in response to an operative condition of one or more of said line buttons, means for preventing the passage of more than one pulse at a time, means for inverting alternate ones of said pulses, and an output circuit having separate switching means with their switching outputs at opposite ends of a transformer winding whereby said alternate pulses actuate the switching means alternately to produce AC signal across said transformer winding.

2. A telephone instrument as claimed in claim 1, in which said transmitting means comprises an up-down shift register, and means responsive to a predetermined first series of pulses emitted for emitting a second series of pulses complementary to the first series.

3. A telephone instrument as claimed in claim 1, in which said preventing means comprise a plurality of gates clocked at intervals of said first and second duration and an Exclusive OR gate for passing pulses from only one of said clocked gates at a time.

4. A telephone instrument as claimed in claim 1, in which said inverting means comprises a flip-flop circuit toggled at a predetermined frequency to activate an output of said flip-flop circuit and in which said output of said flip-flop has direct connection to one of said switching means and an inverter connection from said flip-flop output to the other of said switching means.

5. A multiple line telephone instrument adapted for coupling to lines of a telephone system using a common pair of conductors from the instrument for transferring time shared line condition data bidirectionally between the instrument and the system, and in which data transfer between the instrument and system is in diphase form and is converted to binary in said instrument; said instrument comprising: means for decoding incoming signals representing the conditions of lines accessible at said instrument, decoding means for converting incoming data to binary form, said decoding means including diphase error detecting means, said decoding means including a plurality of bistable members serially connected to receive diphase data, a plurality of Exclusive OR gates, each gate having inputs from adjacent ones of said bistable members to produce a binary output only when said members exhibit different diphase input conditions, storage means for storing a complete sequence of data in binary form, and means for reading data out of said storage means only when a full sequence of error free binary data has been received and stored.

6. A telephone instrument as claimed in claim 5 in which said storing means comprises shift register means for storing said binary data and a further bistable member for controlling the reading of binary data from said shift register means.

7. A telephone instrument as claimed in claim 6 in which there are further shift register means connected to said last mentioned bistable member for decoding the binary data received therefrom, and a plurality of parallel output paths from said last mentioned shift register means, and switching means in each path for responding to binary data sent to the respective paths from the register means.

8. A telephone instrument adapted for access to a plurality of telephone lines over a pair of data conductors and a pair of speech conductors both pairs being common to said plurality of lines, and in which each of said lines is represented by a visual display indicating the condition of the represented line and each line is represented by a manually actuatable switch for changing the condition of the line represented, means in said instrument for sensing the actuation of one of said switches for producing a binary code representative of the line condition change, said sensing means comprising a shift register clocked at a predetermined rate, a plurality of input paths in parallel to said shift register, each of said paths directed to one of said switches and each of said paths adapted to be latched within said shift register in response to operation of its switch to clock a serial binary code out of the shift register indicative of the operative switch, and in which there are means for reading the serial output of said shift register first in a forward and then in the reverse direction and for producing one binary code from the forward reading and a complementary binary code from the reverse reading.

9. A telephone instrument as claimed in claim 8, in which there are means for converting said binary code to diphase format, said converting means comprising gating means and a bistable output member.

* * * * *